United States Patent [19]

Dove

[11] 4,180,108
[45] Dec. 25, 1979

[54] REMOVABLE MOUNTED TEETH IN BRUSH CLEARING SAW

[76] Inventor: Ralph E. Dove, Rte. No. 4, Sedalia, Mo. 65301

[21] Appl. No.: 864,741

[22] Filed: Dec. 27, 1977

[51] Int. Cl.² ............................................. A01G 23/08
[52] U.S. Cl. ..................................... 144/34 F; 83/840
[58] Field of Search ......................... 83/838, 840, 841; 144/2 N, 34 R, 34 F, 218

[56] References Cited

U.S. PATENT DOCUMENTS

| 306,967 | 10/1884 | Simonds | 83/84 X |
| 3,570,566 | 3/1971 | McCreery | 144/2 N |
| 3,804,138 | 4/1974 | Adcock | 144/34 F |
| 3,809,135 | 5/1974 | Dove | 144/34 F |
| 4,018,255 | 4/1977 | Diggs | 144/34 R |

*Primary Examiner*—Robert L. Spruill
*Assistant Examiner*—W. D. Bray
*Attorney, Agent, or Firm*—Laurence R. Brown

[57] ABSTRACT

A brush clearing saw blade assembly attachment for a tractor pushed substantially parallel to the ground is grooved to receive replaceable teeth mating in the grooves and each frictionally held in place by a removable pin. The blade assembly between adjacent teeth is contoured for self-cleaning action.

2 Claims, 4 Drawing Figures

REMOVABLE MOUNTED TEETH IN BRUSH CLEARING SAW

This invention relates to saw blades and more particularly it relates to saw blades pushed ahead of a tractor to clear brush and trees.

BACKGROUND OF THE INVENTION

My U.S. Pat. No. 3,809,135 issued May 7, 1974, describes an earth working blade assembly of the nature to which this improvement is directed. This specification includes by reference the entire disclosure of that patent for a background understanding of the present invention. Similar saw blades are also described in U.S. Pat. Nos. 3,033,253 issued May 8, 1962 to G. M. Purdy; 2,633,880 issued Apr. 7, 1953 to W. Mattson; and 3,004,570 issued Oct. 17, 1961 to W. R. Clayton et al.

The most significant problem with such saws is that the teeth become broken so that the entire blade assembly must be replaced. Although replaceable teeth are known heretofore in relatively light weight movable chain saw links such as represented in U.S. Pat. No. 2,661,940 issued Dec. 8, 1953 to L. G. Rollins, there are no successful replaceable teeth available in the prior earth working tractor motivated blade saws, which must withstand heavy impact forces and significantly heavier thrust forces imposed by the weight and power of a tractor or bulldozer and movable at tractor motivated variable speeds.

Another problem of these earth working saws is the fouling of teeth with debris that accumulates to prevent appropriate access to the cutting edges for their cutting function.

OBJECT OF THE INVENTION

It is therefore a principle object of the invention to provide tractor pushed brush clearing saws with replaceable teeth.

A secondary object of the invention is to provide a self-cleaning saw blade assembly.

BRIEF DESCRIPTION OF THE INVENTION

Other features, objectives and advantages of the invention will be found throughout the following description of a preferred embodiment of the invention, which provides substantially rectangular shaped longitudinal saw teeth snugly fitted into mating grooves of a cutting blade assembly with each tooth locked in place with a removable friction pin. Thus, there are no surfaces interfering with the sawing function, the cost is low and replaceability in the field is simple with minimal tools while the sawblade assembly is in place for use.

THE DRAWING

The invention is described in more detail with reference to the accompanying drawing, wherein.

THE DETAILED DESCRIPTION

Figure 1:
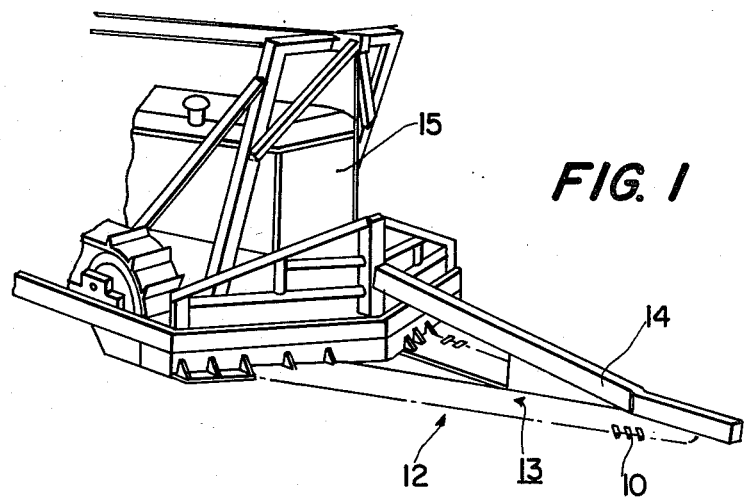
FIG. 1 is a perspective sketch of a typical earth working saw embodiment of the invention in place with blade pushed by a bulldozer substantially horizontal to the ground.
Figure 2:
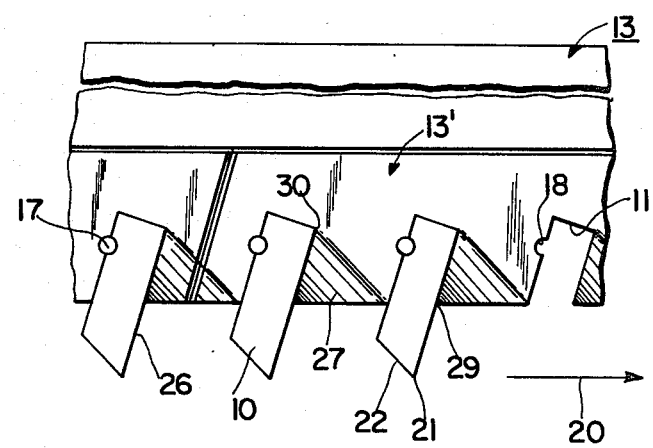
FIGS. 2 and 3 are fragmental plan and edge views of the replaceable saw tooth mounting details, showing the blade contour on the tooth holding blade assembly which aids the self-cleaning tooth action.
Figure 3:
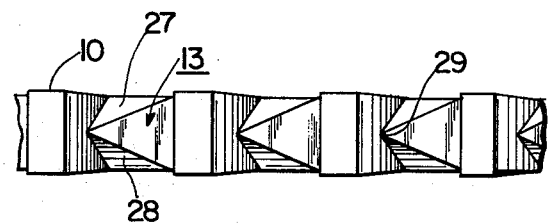

With reference to the accompanying drawing it may be seen that individual teeth 10 may be mated snugly into grooves 11 along the cutting edge 12 of a blade assembly 13 of a brush cutting saw attachment mounted by framework 14 for motivation by pushing ahead of tractor 15. The framework preferably holds two cutting edges 12 in a generally triangular shaped blade assembly with the apex in the direction of the tractor forward travel and with a pair of opposed cutting edges 12 extending backwardly from the apex.

The teeth 10 are longitudinal and substantially rectangular in shape with locking means therein defined solely by a half cylindrical hole 16 defined perpendicularly through the tooth when in a mounted blade assembly for receiving frictionally a tapered locking pin 17 mating between the tooth hole 16 and a corresponding mating half cylindrical hole 18 defined in the blade assembly 13 alongside generally rectangular mating groove 11.

The rectangular groove 11 receives tooth 10 snugly over a majority of its length to hold it in place firmly against the cutting forces required when the tractor moves the teeth in the direction of arrow 20. Thus, the cutting point 21 leads with a trailing leveled tooth face 22 raked backwardly.

To support the tooth strongly for cutting forces the entire face 25 inserted in groove 11 is supported by a blade 13 body of substantially the same thickness. Pin 17 is flush with the opposite surfaces of blade 13 to prevent any interfering mounting hardware conditions.

Since the primary forces in cutting are along the cutting edge opposite the arrow 20, the supporting surface on the leading face 26 of the teeth need not be as great. Therefore the opposite surface of the blade assembly 13 are contoured at 27, 28 to taper down to substantially an apex 29 at the outer extremity of the blade-tooth leading edge contact position.

This construction along with the raked mounting of the teeth with a slant of the leading edge 26 with roots 30 forwardly placed from cutting edge 26 in direction 20 of cutting action, provides a self-cleaning action to prevent debris from filleting the areas between teeth to reduce cutting effectiveness. Thus, the forward tractor motion provides forces for the cuttings to ride the front face 26 of the teeth back toward the cutting blade 13 assembly and up the sloped contour faces 27, 28 thereby polishing the faces and preventing accumulation. This self-cleaning action permits a full effective tooth bite of the front faces 26 of the teeth in the conditions encountered by brush clearing assemblies of this type.

Figure 4:
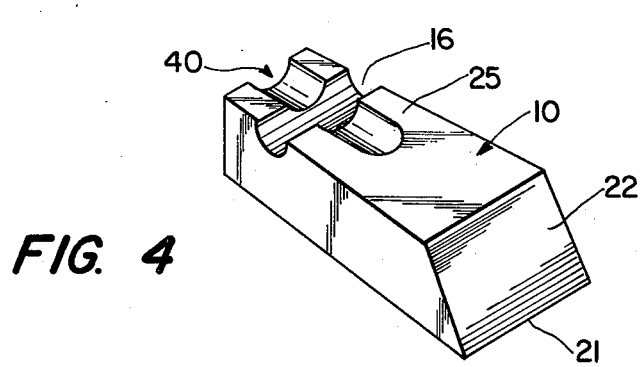
FIG. 4 is a perspective view of a replaceable longitudinal saw tooth substantially rectangular in shape.

Teeth 10 (FIG. 4) have a groove 40 on back side 25 running lengthwise. This is to stabilize tooth 10 when under force.

It is therefore evident that this invention has improved the state of the art of brush cutting saw blades and therefore those novel features believed descriptive of the nature and spirit of the invention are defined with particularity in the appended claims.

What is claimed is:

1. A saw blade assembly movable by a tractor as the tractor moves forward, comprising in combination, at least one substantially planar cutting assembly in the form of a blade having opposite surfaces and presenting a cutting edge, an attachment for holding the blade on the tractor front with the blade disposed horizontally to the ground with cutting edge outboard, a plurality of receptacle grooves disposed along and facing inboard on the cutting edge of said blade for receiving and supporting teeth therein, individual replaceable longitudinal teeth disposed and held snugly in said grooves along more than half of their longitudinal length with the remainder of the tooth extending beyond the groove, and a space formed in the blade between adjacent said grooves by a bevelled portion of the blade adjacent the leading edge of the tooth whereat the blade contacts the leading tooth face at a reduced thickness apex portion thereby serving to produce a clearance channel in the blade body on both sides thereof carrying chips away from the spacing between the teeth by forces imposed during the forward motion of said tractor.

2. A saw blade assembly as defined in claim 1 wherein the longitudinal teeth are rectangularly shaped to mate within said grooves and the teeth portions extending beyond the blade have a bevelled outer end raked backwardly from the leading edge toward the blade to present a cutting point at the leading edge.

* * * * *